United States Patent [19]

Nieh

[11] 4,415,717
[45] Nov. 15, 1983

[54] POLYMERIC CATIONIC SUBSTITUTED ACRYLAMIDE SURFACTANTS

[75] Inventor: Edward C. Y. Nieh, Austin, Tex.

[73] Assignee: Texaco Inc., White Plains, N.Y.

[21] Appl. No.: 439,093

[22] Filed: Nov. 4, 1982

[51] Int. Cl.$^3$ ............................................. C08F 220/60
[52] U.S. Cl. ..................................... 526/287; 524/555;
524/745; 526/304; 526/292.9; 526/923
[58] Field of Search ................. 526/287; 524/555, 745

[56] References Cited

U.S. PATENT DOCUMENTS 2,834,758  5/1958  Shacklett .............................. 526/304
2,980,657  4/1961  Melamed .............................. 526/304
4,138,446  2/1979  Kawakami et al. ................. 526/304

FOREIGN PATENT DOCUMENTS 4817499  4/1970  Japan ................................... 526/304

Primary Examiner—Joseph L. Schofer
Assistant Examiner—Peter F. Kulkosky
Attorney, Agent, or Firm—Robert A. Kulason; Jack H. Park; Richard A. Morgan

[57] ABSTRACT

A new composition of matter is revealed which comprises a copolymer of a surface active quaternary ammonium monomer salt and from 50 wt % to 97 wt % of acrylamide. The new copolymers can have molecular weights substantially greater than 10,000 and still remain water soluble and surface active.

14 Claims, No Drawings

POLYMERIC CATIONIC SUBSTITUTED ACRYLAMIDE SURFACTANTS

BACKGROUND OF THE INVENTION

1. Field of the Invention

This invention relates to novel cationic surfactants which are prepared by copolymerization of acrylamide with a quaternary ammonium monomer.

2. Description of the Prior Art

Cationic monomers of the acrylamide or methacrylamide type are known. Specifically, preparation of the monomer starting material of the present invention is described in U.S. Pat. No. 4,212,820 Hotchkiss et. al. Water soluble surface active copolymers containing acrylamide and N-butyl acrylamide are also known in the art and of particular interest are U.S. Pat. Nos. 4,098,987 and 4,171,418 both Barua et al.

Acrylamide copolymers in the prior art have found use in liquid detergents and in secondary oil recovery processes where surface activity and high viscosity are required. Use of acrylamide copolymers of this type has been limited because of the water insolubility of all but the lower molecular weight copolymers.

It is the objective of the present invention to prepare a new class of surfactant copolymers composed of acrylamide and cationic surface active monomers which are water soluble and surface active at molecular weights greater than 10,000.

SUMMARY OF THE INVENTION

The invention relates to copolymers which consist of a quaternary ammonium monomer of the general formula:

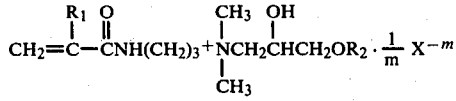

wherein $R_1$ is a radical selected from the group consisting of hydrogen and methyl and $R_2$ is a linear alkyl radical of from 8 to 20 carbon atoms, X is an anion of an organic or mineral acid having a valence of m; and from 50 wt% to 97 wt% of acrylamide.

It has been found surprisingly that this new class of copolymers is water soluble and surface active at molecular weights in excess of 10,000.

DESCRIPTION OF THE PREFERRED EMBODIMENTS

Synthesis of the quaternary ammonium monomer of the present invention is described in U.S. Pat. No. 4,212,820, Hotchkiss et. al. and is incorporated herein in its entirety by reference. The monomer wherein $R_1$ is methyl is synthesized with ease and with high yields. When $R_1$ is hydrogen, the yields are considerably reduced. $R_2$ is a linear alkyl radical of from 8 to 20 carbon atoms. It has been found that particularly good surface activity is demonstrated when $R_2$ is a linear alkyl of from 12 to 14 carbon atoms.

Compounds of the present invention are useful for their surface activity and their activity as flocculants.

A wide variety of organic or inorganic acids may be employed, and thus X in the above formula defining the final products may represent anionic radicals such as halo including chloride, bromide, or iodide, acetate, lactate, gluconate, sulfate, nitrate, alkylsulfate, alkyl and arylsulfonates, e.g., methyl-, ethyl-, propylbenzenesulfonate, formate, propionate, oxalate, phenylsulfonate, benzoate, borate, etc. Preferred acids include acetic acid, hydrochloric acid, and sulfuric acid.

Copolymers of the present invention are prepared by polymerization techniques known in the art. The quaternary ammonium monomer is dispersed under inert atmosphere in aqueous solution which may additionally contain dissolved therein a low molecular weight alcohol such as ethanol, isopropanol and the like. Acidic polymerization initiator such as the azo initiators, organic peroxides or redox initiators such as the sulfite-persulfate system is then added in an amount calculated to yield a polymer product of desired molecular weight.

After the initiator is added, the resin flask is heated under inert atmosphere until the quaternary ammonium monomer begins to react at approximately 50° C. When the exotherm is detected, the heat source is removed until the reaction mixture returns to approximately 50° C. to 60° C. Then external heating is resumed and the reaction mixture is digested at 50° C. to 60° C. until reaction is completed.

It has been found that acrylamide additions of from 50 wt% to 97 wt% are possible. High molecular weight polymers which contain 50 wt% to 70 wt% acrylamide have shown beneficial properties in applications where viscous, water soluble, surface active fluids are required at temperatures of about 25° C. to about 90° C. In the Example are shown three solutions wherein the amount of acrylamide is from 60 wt% to 70 wt%.

It has been found surprisingly, that the molecular weight of the polymeric cationic surfactants of the present invention can be substantially greater than 10,000 and still remain water soluble and surface active. Typically, water solutions contain from 0.01 wt% to 5 wt% of copolymer dissolved in water and/or brine.

The copolymers of the present invention are of particular interest and use because the degree of control over the hydrophilic-lipophilic balance of the resulting polymeric surfactants can be effected by appropriate selection of the linear alkyl radical $R_2$ and by the acrylamide to cationic surfactant monomer ratio and by degree of polymerization. This characteristic is useful in waste water treatment particularly where solid suspensions are present or where there are anionic surfactants in the waste water to be treated. The class of compounds of the present invention are most useful as a thickener with surfactant and flocculant qualities.

EXAMPLE I-III

In a resin flask, a mixture of water acrylamide and a surface active cationic monomer is heated to 50° C. under a nitrogen atmosphere. The polymerization is initiated by 2 ml of 5% 2,2′azobis(2-amidinopropane)-hydrochloride and is allowed to continue at 50° C. after the exotherm passes for a period of six hours. The solution properties, namely, viscosity, surface tension, and interfacial tension of 1%, 0.1%, and 0.01% aqueous solutions of the resulting polymer were measured and are summarized in Table I.

EXAMPLE IV

In a field in which the primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895-6915 feet.

The hydrocarbon-bearing formation in both the injection well and the production well is hydraulically fractured using conventional techniques, and a gravel-sand mixture is injected into the fracture to hold it open and prevent healing of the fracture.

In the next step, water at a temperature of 75° F. containing dissolved therein 1% by weight of the copolymer of Example I is injected via the injection well into the formation at a pressure of about 1300 psig and at the rate of 0.05 barrels per minutes. Injection of the driving fluid continues at the rate of 1.05 barrels per minute and at the end of 67 days, a substantial production of petroleum is achieved.

TABLE I

| | | | | | Solution Properties of Product at 25° C. | | | |
|---|---|---|---|---|---|---|---|---|
| Example | Surface Active Monomer,[a] | | Acrylamide, g | Water, g | % Copolymer[b] | Viscosity Centistokes | Surface Tension dyne/cm | Interfacial Tension dyne/cm |
| I | 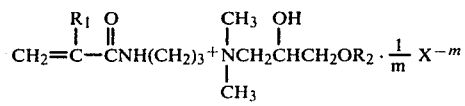 Where R = $C_{12}$ to $C_{14}$ alkyl | | 15 | 50 | 151 | 1.0<br>0.1<br>0.01 | 3.8<br>1.5<br>0.9 | 41<br>50<br>56 | 19<br>19<br>23 |
| II | 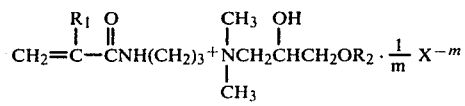 Where R = $C_{12}$ to $C_{14}$ alkyl | | 15 | 50 | 220 | 1.0<br>0.1<br>0.01 | 9.5<br>2.5<br>0.9 | 36<br>45<br>59 | 15<br>25<br>30 |
| III | 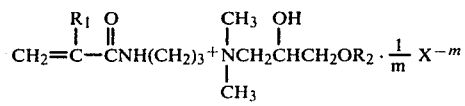 Where R = $C_{12}$ to $C_{14}$ alkyl | | 15 | 25 | 410 | 1.0<br>0.1<br>0.01 | 9.2<br>2.4<br>1.1 | 38<br>47<br>62 | 16<br>26<br>35 |

[a] The preparation of this monomer is described in U.S. Pat. No. 4,212,820
[b] Aqueous solution
[c] Water/light mineral oil The principle of the invention and the best mode contemplated for applying that principle have been described. It is to be understood that the foregoing is illustrative only and that other means and techniques can be employed without departing from the true scope of the invention defined in the following claims.

What is claimed is:

1. A copolymer which consists of:
   (A) a quaternary ammonium monomer of the general formula:

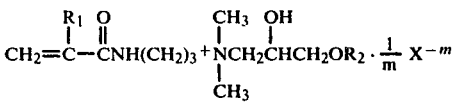

wherein $R_1$ is a radical selected from the group consisting of hydrogen and methyl and $R_2$ is a linear alkyl radical of from 8 to 20 carbon atoms, X is an anion or an organic or mineral acid having a valence of m; and
   (B) from 50 wt% to 97 wt% of acrylamide.

2. The copolymer of claim 1 wherein $R_2$ is a linear alkyl of from 12 to 14 carbon atoms.

3. The copolymer of claim 1 wherein $R_1$ is methyl.

4. The copolymer of claim 1 wherein $R_1$ is methyl and $R_2$ is a linear alkyl radical of from 12 to 14 carbon atoms.

5. The copolymer of claim 1 wherein (B) the acrylamide is from 50 wt% to 70 wt%.

6. The copolymer of claim 1 wherein (B) the acrylamide is from 60 wt% to 70 wt%.

7. An aqueous solution comprising from 0.01 wt% to 5 wt% of
   (I) a copolymer consisting of
      (A) a quaternary ammonium monomer of the general formula:

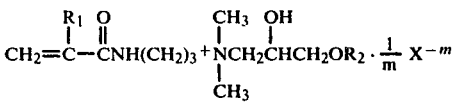

wherein $R_1$ is a radical selected from the group consisting of hydrogen and methyl and $R_2$ is a linear alkyl radical of from 8 to 20 carbon atoms, X is an anion of an organic or mineral acid having a valence m, and
      (B) from 50 wt% to 97 wt% of acrylamide; and
   (II) water.

8. The solution of claim 7 wherein $R_2$ is a linear alkyl of from 12 to 14 carbon atoms.

9. The solution of claim 7 wherein $R_1$ is methyl.

10. The solution of claim 7 wherein $R_1$ is methyl and $R_2$ is a linear alkyl radical of from 12 to 14 carbon atoms.

11. The solution of claim 7 wherein the solution additionally contains brine.

12. The solution of claim 7 wherein in (B) the acrylamide is from 50 wt% to 70 wt%.

13. The solution of claim 7 wherein in (B) the acrylamide is from 60 wt% to 70 wt%.

14. The solution of claim 7 wherein the solution contains from 0.01 wt% to 1.0 wt% of the copolymer.